US011674833B2

(12) United States Patent
Hornung et al.

(10) Patent No.: US 11,674,833 B2
(45) Date of Patent: Jun. 13, 2023

(54) DETECTION OF CONTAMINATIONS ON A SENSING SURFACE OF A THERMAL SENSOR

(71) Applicant: Sensirion AG, Stäfa (CH)

(72) Inventors: Mark Hornung, Stäfa (CH); Andreas Rüegg, Stäfa (CH); Harry Figi, Stäfa (CH); Lucas Huber, Stäfa (CH)

(73) Assignee: Sensirion AG, Stäfa (CH)

( * ) Notice: Subject to any disclaimer, the term of this patent is extended or adjusted under 35 U.S.C. 154(b) by 596 days.

(21) Appl. No.: 16/709,043

(22) Filed: Dec. 10, 2019

(65) Prior Publication Data
US 2020/0200580 A1 Jun. 25, 2020

(30) Foreign Application Priority Data
Dec. 20, 2018 (EP) ..................................... 18214753

(51) Int. Cl.
*G01F 1/7084* (2022.01)
*G01F 1/698* (2006.01)
*G01K 13/02* (2021.01)

(52) U.S. Cl.
CPC ............ *G01F 1/7084* (2013.01); *G01F 1/698* (2013.01); *G01K 13/02* (2013.01)

(58) Field of Classification Search
CPC ........ G01F 1/7084; G01F 1/698; G01F 1/699; G01F 25/10; G01F 1/6965; G01F 1/6888;
(Continued)

(56) References Cited

U.S. PATENT DOCUMENTS

| 4,478,076 A | 10/1984 | Bohrer |
| 6,328,467 B1 | 12/2001 | Keyhani |

(Continued)

FOREIGN PATENT DOCUMENTS

| EP | 1 065 475 A2 | 1/2001 |
| EP | 1 965 179 A1 | 9/2008 |

(Continued)

OTHER PUBLICATIONS

Extended European Search Report dated Jul. 17, 2019 in Related European Appl. No. 18214753.8 (9 pgs.).

(Continued)

*Primary Examiner* — Freddie Kirkland, III
(74) *Attorney, Agent, or Firm* — Foley & Lardner LLP

(57) ABSTRACT

A thermal sensor comprises an active element (41), e.g., a heater or cooler, at least one temperature sensor (31), and processing circuitry (50). The processing circuitry causes a change of power supplied to the active element (41). It then determines, at a plurality of times, a thermal parameter based on an output signal of the temperature sensors and analyzes the transient behavior of the thermal parameter. Based on this analysis, the processing circuitry determines a contamination signal that is indicative of a contamination on a sensing surface of the thermal sensor. If the thermal sensor comprises a plurality of temperature sensors arranged in different sectors of the sensing surface, a multi-sector thermal signal can be derived from the outputs of the sensors, and determination of the contamination signal can be based on the multi-sector thermal signal.

24 Claims, 9 Drawing Sheets

(58) Field of Classification Search
CPC ....... G01F 1/6845; G01F 1/692; G01K 13/02;
G01N 25/72
See application file for complete search history.

(56) References Cited

U.S. PATENT DOCUMENTS

| | | | | |
|---|---|---|---|---|
| 7,644,613 | B2* | 1/2010 | Mayer | G01F 1/6888 |
| | | | | 73/204.26 |
| 7,650,784 | B2* | 1/2010 | Watanabe | G01F 1/699 |
| | | | | 73/204.26 |
| 9,557,202 | B2* | 1/2017 | Knittel | G01F 1/696 |
| 9,612,146 | B2 | 4/2017 | Speldrich et al. | |
| 9,664,545 | B2* | 5/2017 | Knittel | G01F 1/6845 |
| 9,964,423 | B2 | 5/2018 | Grohmann | |
| 10,816,285 | B2* | 10/2020 | Chattoraj | G01K 1/024 |
| 2008/0250856 | A1 | 10/2008 | Watanabe et al. | |
| 2015/0285666 | A1 | 10/2015 | Knittel et al. | |
| 2018/0245865 | A1 | 8/2018 | Chattoraj et al. | |

FOREIGN PATENT DOCUMENTS

| | | |
|---|---|---|
| EP | 2 930 475 A1 | 10/2015 |
| EP | 3 037 791 A1 | 6/2016 |
| EP | 3 367 087 A2 | 8/2018 |
| WO | WO-01/98736 A1 | 12/2001 |
| WO | WO-02/073140 A2 | 9/2002 |

OTHER PUBLICATIONS

European Office Action in corresponding European Application No. 18214753.8 dated Aug. 29, 2022.

* cited by examiner

DETECTION OF CONTAMINATIONS ON A SENSING SURFACE OF A THERMAL SENSOR

CROSS REFERENCE TO RELATED APPLICATIONS

This application claims priority to European Appl. No. 18 214 753.8, filed Dec. 20, 2018; the contents of which are incorporated by reference herein in their entirety.

TECHNICAL FIELD

The present invention relates to a thermal sensor, in particular to a thermal flow sensor, which is configured to detect the presence of contaminations on a sensing surface of the thermal sensor. The present invention further relates to a method of detecting contaminations on a surface of a thermal sensor and to a corresponding computer program product.

PRIOR ART

Commonly used microthermal flow sensors comprise a heater and two spatially separated temperature sensors. The temperature sensors are typically located symmetrically upstream and downstream of the heater to measure the amount of heat that has been carried away by the flow medium. The heater and the temperature sensors may be embedded in or arranged on a thin membrane that spans a recess or opening in a bulk semiconductor material. Thermopiles may be employed as temperature sensors. An example of this type of microthermal flow sensor is disclosed in WO 01/98736 A1.

As a measure for the mass flow rate, the difference between the steady-state temperatures determined by the up- and downstream temperature sensors while the heater is activated can be used. However, besides the intended dependence on the mass flow rate, there are a number of other factors that influence this temperature difference, each of these factors causing a non-zero offset of the temperature difference at zero flow rate:

Waste heat of surrounding electrical circuitry: The activity of energy-dissipating elements integrated on the bulk material surrounding the membrane, such as the electrical circuitry measuring and processing the voltage difference signal, can affect the temperature difference. The challenges in conjunction with waste heat of the surrounding electrical circuitry can be addressed by evaluating a compensation temperature signal, as disclosed in EP 2 930 475 A1.

Production-related membrane asymmetries: The sensor offset is most often dominated by geometrical asymmetries of the sensor structure, which can, for instance, be caused by asymmetric backside etching of the bulk material to release the membrane. Such membrane asymmetries can be difficult to characterize. For instance, depending on the assembly concept of a flow sensor, optical inspection of the membrane is not always possible in the final package.

Contaminations on the membrane: Contaminations can for example be caused by airborne particles or droplets that are deposited on the membrane. Several prior-art documents relate to measures for avoiding contaminations (see for instance WO 02/073140 A2, EP 3 037 791 A1, or U.S. Pat. No. 9,612,146 B2). However, it is not always possible to completely avoid contaminations. A particle or droplet that has been deposited on the membrane off-center affects the thermal conductivity and the thermal capacity of the sensor differently on the upstream and downstream sides and will therefore affect the temperature difference.

If an offset arises, it can be desirable to determine whether the offset has been caused by a production-related membrane asymmetry or by a contamination. If zero-flow conditions cannot readily be achieved, it can further be desirable to distinguish between an offset caused by a contamination and a sensor signal caused by an actual flow.

Also known are microthermal flow sensors that comprise separate bridges for carrying the heater and the temperature sensors instead of having a continuous membrane (see, e.g., U.S. Pat. No. 4,478,076). Similar problems also arise for this type of sensor. For instance, asymmetries of the bridges and contaminations on the bridges can both cause an offset of the sensor output. It may also be desired to detect contaminations on other types of thermal sensors, e.g., on microthermal sensors for determining the thermal capacity of a fluid, as disclosed in EP 3 367 087 A2.

EP 1 065 475 A2 discloses a method of determining a flow rate using a calorimetric flow sensor having a heater and two temperature sensors arranged on a membrane. The temperature sensors measure the temperature difference upstream and downstream from the heater. In addition, at least a second temperature difference is measured which depends in a different way on the gas flow and on the thickness of the membrane. The two temperature differences are used to calculate a measurement signal which depends less on the thickness of the membrane, in particular, on the effect of accumulation of dirt on the membrane. However, the method of this document assumes that the dirt accumulates homogeneously over the entire surface of the membrane, which leads to changes in sensitivity rather than to offsets. The method does not compensate for offsets of the flow signal created by inhomogeneous contaminations.

EP 1 965 179 A1 discloses a thermal flow sensor that is equipped with a self-test unit for monitoring the device and generating a fault signal in the presence of a malfunction. The self-test unit can, e.g., monitor the integrity of a membrane carrying a heater and temperature sensors, or it can monitor various operational parameters of the device. The document is silent about the detection of contaminations.

SUMMARY OF THE INVENTION

It is an object of the present invention to provide a thermal sensor, in particular, a thermal flow sensor for measuring a flow rate of a fluid flow, the thermal sensor being configured to detect contaminations of a sensing surface of the thermal sensor, such as a membrane or bridges carrying a heater and temperature sensors of the thermal sensor.

According to the first aspect, a thermal sensor is provided, in particular, a thermal flow sensor for measuring a flow rate of a fluid flow, the thermal sensor comprising:

an active element configured to be supplied with power so as to cause a temperature change of the active element, in particular, a heater or cooler;

at least one temperature sensor arranged in the vicinity of the active element such that a temperature change of the active element can cause a temperature change of the at least one temperature sensor; and processing circuitry configured to carry out the following steps:

causing a change of power supplied to the active element;

at a plurality of times, determining a thermal parameter based on output signals of the at least one temperature sensor;

analyzing a transient behavior of the thermal parameter in response to the change of power;

based on the analysis of the transient behavior of the thermal parameter, determining a contamination signal that is indicative of a contamination on a sensing surface of the flow sensor.

According to the first aspect of the invention, the transient behavior of a thermal parameter derived from the output of at least one temperature sensor is analyzed, and from this analysis conclusions about the presence or absence of a contamination on the sensing surface are drawn. This is based on the finding that the transient behavior is influenced in a different manner by contaminations than by either a flow or a production-related asymmetry of the sensing surface. In particular, the transient behavior depends in different ways on changes of the thermal conductivity and on changes of the thermal capacity. A contamination influences thermal conductivity and thermal capacity in a different manner than a flow or a production-related asymmetry. In this manner it becomes possible to distinguish between these effects.

In some embodiments, the processing circuitry is integrated with the active element and the at least one temperature sensor in a common sensor package or even on the same substrate, e.g., on a common semiconductor chip. In other embodiments, at least parts of the processing circuitry are arranged remotely from the active element and the at least one temperature sensor, for instance, in a separate microcontroller or computer.

In particular, the processing circuitry can comprise a power-control circuit to provide the active element with power, and a readout circuit for reading out the at least one temperature sensor and for determining the thermal parameter. The power control circuit can be configured, e.g., to provide constant power or constant current to the active element, or to power the active element in such a manner that it attains a predetermined temperature. The readout module can comprise, e.g., an analog-to-digital converter (ADC) for digitizing the output signals of the at least one temperature sensor. These circuits are advantageously implemented on a common substrate, in particular, a common semiconductor chip, together with the active element and the at least one temperature sensor. The circuits can be implemented, e.g., in CMOS technology. The processing circuitry can further comprise an analyzer circuit that is configured to carry out the steps of analyzing the transient behavior and determining the contamination signal. The analyzer circuit can be integrated with the power-control circuit and the readout circuit in a common sensor package or even on a common substrate, or it can be remote from the power-control circuit and the readout circuit. The analyzer module can be implemented, e.g., in the form of an ASIC that is configured to carry out the steps of analyzing the transient behavior and determining the contamination signal by implementing a simple state machine. In other embodiments, the analyzer module can be implemented in the form of a general-purpose computer that is programmed to execute the steps of analyzing the transient behavior and determining the contamination signal.

The processing circuitry can further comprise an I/O interface configured to output the contamination signal. In the alternative or in addition, the processing circuitry can comprise a compensation circuit configured to carry out a compensation for the contaminations in subsequent measurements that are made with the thermal sensor, based on the contamination signal.

In some embodiments, the step of analyzing the transient behavior of the thermal parameter can comprise comparing the transient behavior of the thermal parameter to a reference transient. To this end, the processing circuitry can comprise a memory device, the memory device storing the reference transient, and a comparator for reading out the reference transient from the memory device and for carrying out the comparison.

The step of analyzing the transient behavior of the thermal parameter can comprise:

based on the transient behavior, deriving a transient amplitude; and comparing the transient amplitude to a reference amplitude or to a threshold.

Only a few data points are required for carrying out a comparison between the measured transient and the reference transient, and/or for deriving the transient amplitude. For instance, already three or four data points may be sufficient. These steps can therefore be easily implemented by a simple logic circuit, e.g., in an ASIC.

In some embodiments, the step of analyzing the transient behavior of the thermal parameter comprises carrying out a fitting procedure of the time dependence of the thermal parameter to a superposition of at least two time-dependent functions to obtain a weighting factor for at least one of the functions. Preferably one of the weighting factors is (at least predominantly) indicative of the contribution of thermal resistance to the transient behavior, while another weighting factor is (at least predominantly) indicative of the contribution of thermal capacity to the transient behavior. The step of determining the contamination signal can include taking into account the at least one weighting factor determined by the fitting procedure, preferably at least the weighting factor that is indicative of the contribution of thermal capacity. In some embodiments, the contamination signal is directly computed from the weighting factors or can even be identical to one of these weighting factors, in particular, to the weighting factor that is indicative of the contribution of thermal capacity.

In some embodiments the thermal sensor comprises not only one single temperature sensor, but a plurality of temperature sensors arranged in different sectors of the sensing surface. In this case it is advantageous if the thermal parameter is a multi-sector thermal parameter based on a combination of output signals of the plurality of temperature sensors. In particular, a differential thermal parameter can be formed from the output signals of at least two temperature sensors so as to cancel out or at least reduce certain undesired contributions to the output signals and thus facilitate the detection of contaminations, as will be explained by the way of examples in more detail below.

In particular, in some embodiments the thermal sensor comprises at least one first temperature sensor and at least one second temperature sensor, the first and second temperature sensors being arranged in different sectors of the sensing surface. In particular, the one or more first temperature sensors can be arranged on a first side of the active element, and the one or more second temperature sensors can be arranged on a second side of the active element opposite to the first side. In some embodiments, the thermal sensor is a thermal flow sensor for determining a flow rate of a fluid flow, the flow defining a flow direction. The one or more first temperature sensors can then be arranged upstream from the active element relative to the flow direction, and the one or more second temperature sensors can be arranged downstream from the active element. In this case, the first temperature sensors may appropriately be called the upstream temperature sensors, and the second temperature sensor may appropriately be called the downstream temperature sensors.

In some embodiments, the multi-sector thermal parameter is a temperature-difference parameter that is indicative of a temperature difference between the first and second temperature sensors. Such a parameter is particularly sensitive to any asymmetries between the first and second temperature sensors, including asymmetries caused by a contamination in the form of a particle or droplet deposited off-center on the sensing surface. Analyzing the transient behavior of the temperature-difference parameter may therefore facilitate the detection of contaminations.

In some embodiments, the thermal sensor comprises at least two first temperature sensors and at least two second temperature sensors. The multi-sector thermal parameter can then be indicative of a sum or difference of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors. A contamination in the form of a particle or droplet deposited off-center on the sensing surface will cause a temperature inhomogeneity among the first and/or second temperature sensors, which is reflected in the first and/or second temperature inhomogeneity parameters. In the case of a thermal flow sensor, properly defined inhomogeneity parameters will, to first order, be insensitive to the flow rate or will at least have a much reduced sensitivity to the flow rate. In this manner detection of contaminations at non-zero-flow rate is facilitated. If a difference of the inhomogeneity parameters is formed, the resulting multi-sector thermal parameter will further be independent of certain kinds of asymmetries of the sensing surface, in particular, of asymmetries parallel or perpendicular to the heater direction.

A preferred multi-sector thermal parameter is a diagonal-difference parameter formed from the outputs of two first and two second temperature sensors that are mutually aligned to each other. In particular, the two first temperature sensors can be called "left" and "right" first temperature sensors arranged on the first side of the active element, and the two second temperature sensors can be called "left" and "right" second temperature sensors arranged on the second side of the active element. Here, the terms "left" and "right" are to be understood just as nametags for distinguishing the two first temperatures sensors and the two second temperature sensors, respectively, from one another. The terms are not intended to imply an absolute position or orientation. The left second temperature sensor can be aligned with the left first temperature sensor, and the right second temperature sensor can be aligned with the right first temperature sensor. First and second temperature sensors are considered to be "aligned" if they are located opposite to one another on the different sides of the heater. In the case of a flow sensor, they are aligned with respect to the flow direction: Fluid that has passed over a first (upstream) temperature sensor along the flow direction will subsequently also pass over a second (downstream) temperature sensor that is aligned with the first (upstream) temperature sensor. The diagonal-difference parameter is indicative of a difference between a first temperature inhomogeneity parameter and a second temperature inhomogeneity parameter, the first temperature inhomogeneity parameter being indicative of a temperature inhomogeneity between the left and right first temperature sensors, and the second temperature inhomogeneity parameter being indicative of a temperature difference between the left and right second temperature sensors. To first order, the diagonal-difference parameter is independent of asymmetries parallel or perpendicular to the heater direction. If the thermal sensor is a flow sensor, the diagonal-difference parameter is, to first order, also independent of the flow rate.

In such multi-sector embodiments it can be advantageous to also split the active element into at least two separate active elements. In particular, if the active element is a heater, the heater can comprise a first and a second heater element, the first heater element being arranged between the first upstream temperature sensor and the first downstream temperature sensor, and the second heater element being arranged between the second upstream temperature sensor and the second downstream temperature sensor. The same arrangement can be chosen if the active element is a cooler. In this way, essentially two parallel thermal sensors are created.

The above-described detection of contaminations based on the transient behavior of a thermal parameter can be complemented by a detection scheme that builds on comparing a steady-state value of the thermal parameter under zero-flow conditions to a reference value. In particular, the processing circuitry can be configured to carry out the following steps:
  receiving a flow indicator;
  when the flow indicator indicates zero flow rate, causing power to be supplied to the active element;
  determining a steady-state value of the thermal parameter while power is applied to the active element; and
  comparing the steady-state value of the thermal parameter to a reference value to determine a sensor offset parameter.

The flow indicator can, for instance, be set to a logical one whenever flow is present, and can be set to a logical zero whenever the flow has been stopped, e.g., by closing a valve. For instance, the flow indicator can be generated by a valve for regulating the fluid flow.

In some embodiments, the flow is only stopped when the contamination signal that has been obtained by an analysis of the transient behavior indicates the presence of contaminations. The sensor offset parameter is then determined and is subsequently used for offset correction.

In a second aspect, the present invention relates to the concept of utilizing a multi-sector thermal parameter that is derived from the outputs of temperature sensors provided in different sectors of the sensing surface, independently of whether the transient behavior of the multi-sector thermal parameter is analyzed, or whether the steady-state value of the multi-sector thermal parameter is employed.

Accordingly, the present invention provides a thermal sensor, in particular a thermal flow sensor for measuring a flow rate of a fluid flow, the thermal sensor comprising:
  an active element configured to be supplied with power so as to cause a temperature change of the active element, in particular, a heater or cooler;
  at least two first temperature sensors arranged in different sectors of the sensing surface, preferably on a first side of the active element;
  at least two second temperature sensors arranged in different sectors of the sensing surface, preferably on a second side of the active element opposite to the first side; and processing circuitry configured to carry out the following steps:
  causing power to be supplied to the active element;
  determining a multi-sector thermal parameter based on a combination of output signals of the at least two first temperature sensors and of the at least two second temperature sensors; and
  determining a contamination signal that is indicative of a contamination on a surface of the flow sensor device based on the multi-sector thermal parameter.

As discussed above, the multi-sector thermal parameter can be indicative of a sum or difference of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors.

In particular, the multi-sector thermal parameter can be the above-discussed diagonal-difference parameter.

Determination of the contamination signal can be based on a steady-state value of the multi-sector parameter or on its transient behavior.

In both aspects, any type of temperature sensor can be employed. In particular, each of the first and second temperature sensors can be a thermopile, i.e. a set of series-connected thermocouples, or a single thermocouple. In other embodiments, resistive temperature sensors can be employed.

The thermal sensor can comprise a carrier for the active element and the first and second temperature sensors. The carrier can take the form of a membrane or the form of a plurality of separate bridges. The active element and the temperature sensors can be arranged on and/or embedded in the carrier. The sensing surface is formed by the carrier and at least those portions of the active element and the temperature sensors that are arranged on the carrier.

The present invention also relates to methods for determining contaminations on a sensing surface of a thermal sensor according to each of the above-discussed aspects.

In particular, the present invention provides a method of determining contaminations on a sensing surface of a thermal sensor, in particular, a thermal flow sensor for measuring a flow rate of a fluid flow, the thermal sensor comprising an active element configured to be supplied with power so as to cause a temperature change of the active element, in particular, a heater or cooler, and at least one temperature sensor arranged in the vicinity of the active element, the method comprising:
  causing a change of power supplied to the active element;
  at a plurality of times, determining a thermal parameter based on output signals from the at least one temperature sensor;
  analyzing the transient behavior of the thermal parameter in response to the change of power; and
  based on the analysis of the transient behavior of the thermal parameter, determining a contamination signal that is indicative of a contamination on a sensing surface of the thermal sensor.

As discussed above, the step of analyzing the time dependence of the thermal parameter can comprise comparing the transient behavior of the thermal parameter to a reference transient and/or deriving a transient amplitude and comparing the transient amplitude to a reference amplitude or a threshold, and/or it can comprise carrying out a fitting procedure of the time dependence of the thermal parameter to a superposition of at least two time-dependent to obtain a weighting factor for at least one of the functions.

As discussed above, the thermal sensor can comprise a plurality of temperature sensors arranged in different sectors of the sensing surface, and the thermal parameter can be a multi-sector thermal parameter based on a combination of output signals of the plurality of temperature sensors. In particular, the multi-sector thermal parameter can be a temperature-difference parameter that is indicative of a temperature difference between first and second temperature sensors, which can be arranged on different sides of the active element, or it can be being indicative of a sum or difference of a first temperature inhomogeneity parameter and a second temperature inhomogeneity parameter. In particular, the multi-sector parameter can be the above-discussed diagonal-difference parameter.

As discussed above, the method can be augmented by the following steps:
  stopping the fluid flow;
  causing power to be supplied to the active element;
  determining a steady-state value of the thermal parameter while power is being applied to the active element; and
  comparing the steady-state value of the thermal parameter to a reference value to determine a sensor offset parameter.

In another aspect, the present invention provides a method of determining contaminations on a sensing surface of a thermal sensor, in particular a thermal flow sensor for measuring a flow rate of a flow of a fluid, the thermal sensor comprising an active element configured to be supplied with power so as to cause a temperature change of the active element, at least two first temperature sensors arranged in different sectors of the sensing surface, preferably on a first side of the active element, and at least two second temperature sensors arranged in different sectors of the sensing surface, preferably on a second side of the active element opposite to the first side, the method comprising:
  causing power to be supplied to the active element;
  determining a multi-sector thermal parameter based on a combination of output signals of the at least two first temperature sensors and the at least two second temperature sensors, the multi-sector thermal parameter preferably being indicative of a sum or difference of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors; and
  determining a contamination signal that is indicative of a contamination on a surface of the flow sensor device based on the multi-sector thermal parameter.

As discussed above, the multi-sector thermal parameter can be a diagonal-difference parameter.

As discussed above, determination of the contamination signal can be based on a steady-state value of the multi-sector parameter and/or on the transient behavior of the multi-sector parameter.

In yet another aspect, the present invention provides a computer program product for determining contaminations on a sensing surface of a thermal sensor, in particular a thermal flow sensor for measuring a flow rate of a flow of a fluid, the thermal sensor comprising an active element, at least one temperature sensor, and processing circuitry, the computer program product comprising instructions which, when the program is executed by the processing circuitry, causes the processing circuitry to carry out any of the above-described methods. The computer program may be stored on storage medium, in particular, on a non-volatile data carrier.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Setup and Operation of Flow Sensor

Figure 1:
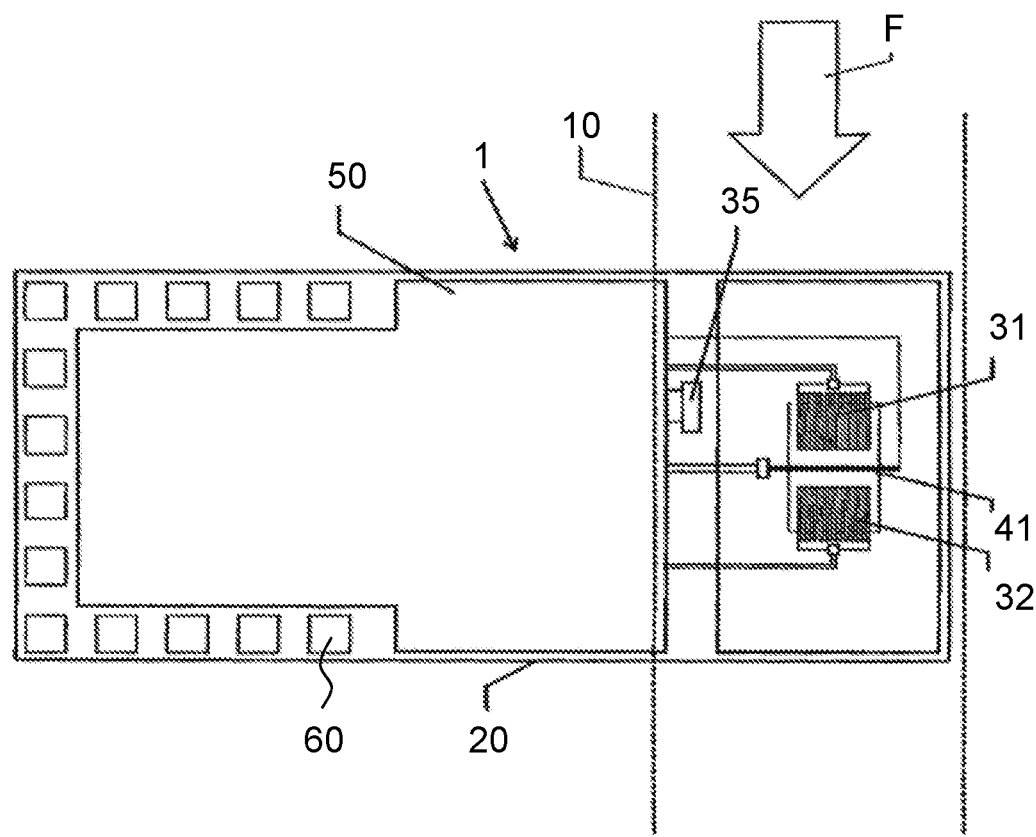
FIG. 1 shows, in a plan view, a flow sensor according to a first embodiment.
Figure 2:
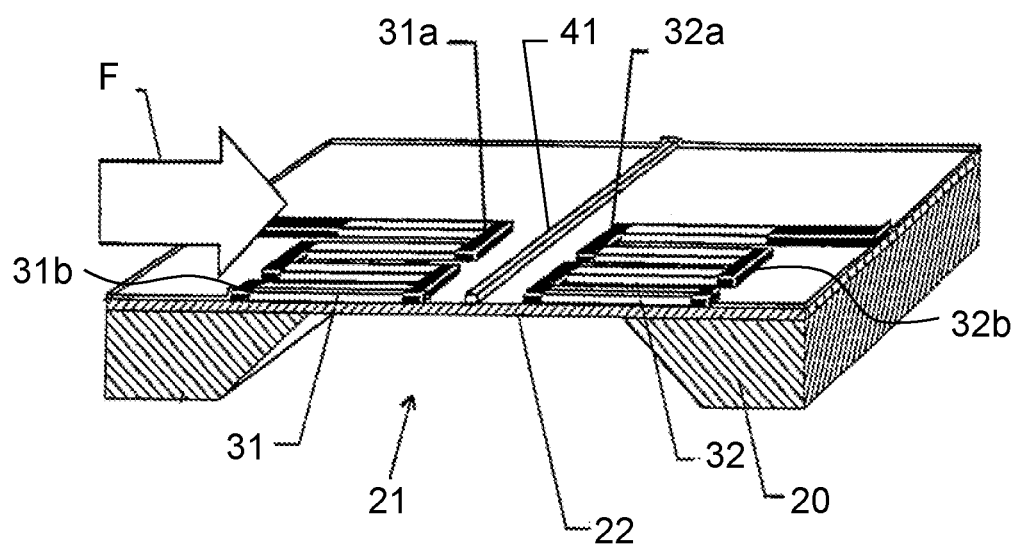
FIG. 2 shows, in a perspective view, a portion of the flow sensor of FIG. 1.

FIG. 1 shows a thermal flow sensor 1 according to a first embodiment. A detail of the flow sensor is illustrated in FIG. 2. The setup and operation of such a flow sensor are disclosed in WO 01/98736 A1. As described in that document, the sensor can be operated to determine a mass flow rate of a fluid (i.e., a gas or a liquid) that flows through a conduit 10 along a flow direction F.

As can be seen in FIG. 2, the flow sensor 1 is integrated on a silicon substrate 20 in which an opening or recess 21 has been formed by etching. A thin membrane 22 spans the opening or recess 21. On the membrane 22, a resistive heater 41, a first (upstream) temperature sensor 31 and a second (downstream) temperature sensor 32 are arranged. The first temperature sensor 31 is arranged upstream of the heater 41 with respect to the flow direction F, while the second temperature sensor 32 is arranged downstream of the heater 41.

In the present example, each of the temperature sensors 31, 32 consists of a thermopile, i.e., a plurality of thermocouples connected in a series configuration. A thermocouple comprises two pieces of dissimilar materials which are joined at one end to form an electrical junction. This junction, which is called the "hot junction", is located on the membrane. In the present example, upstream temperature sensor 31 comprises a plurality of hot junctions 31a, and downstream temperature sensor 32 comprises a plurality of hot junctions 32a. At their other ends, each of the pieces is either joined to the next thermocouple or to a readout terminal. These junctions are called the "cold junctions". They are located on the bulk substrate that surrounds the membrane. In the present example, upstream temperature sensor 31 comprises a plurality of hot junctions 31a and cold junctions 31b, and downstream temperature sensor 32 comprises a plurality of hot junctions 32a and cold junctions 32b. A difference in electrical potential is created whenever there is a difference in temperature between the hot junctions and the cold junctions, resulting in an easily measurable thermoelectric voltage that is indicative of the temperature difference between the hot and cold junctions.

As apparent from FIG. 1, the flow sensor 1 further comprises a reference temperature sensor 35 for determining the temperature of the bulk substrate that surrounds the membrane. The flow sensor further comprises processing circuitry 50, which comprises both analog and digital components for carrying out various tasks, including controlling the heater 41, reading out the temperature sensors 31, 32 and 35, etc. Contact pads 60 are provided for interfacing the flow sensor 1 with external circuitry.

Figure 3:
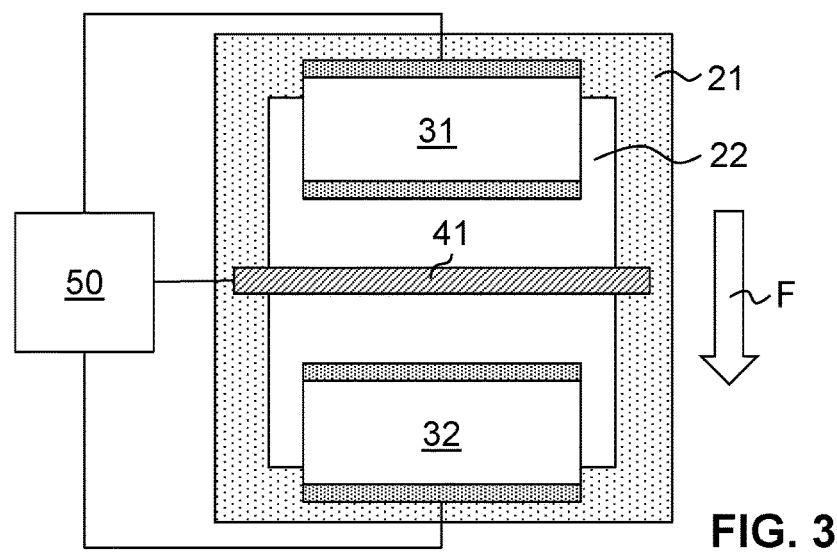
FIG. 3 shows a schematic functional representation of the flow sensor of FIG. 1.

A simplified functional representation of the flow sensor 1 is illustrated in FIG. 3. The substrate 21 is symbolized by a frame, the membrane 22 is symbolized by a white area, the hot and cold junctions of each temperature sensor 31, 32 are symbolized by bars, and the processing circuitry 50 is symbolized by a box. The surface portions of the flow sensor within the outline of the membrane can be considered to form the sensing surface of the flow sensor.

For determining the mass flow rate of the fluid, the flow sensor 1 is operated as follows: The heater is supplied with heater power. While the heater is activated, the upstream and downstream temperature sensors 31, 32 are read out to determine an upstream temperature and a downstream temperature, and the difference of the upstream and downstream temperatures is calculated. In an alternative, the upstream and downstream temperature sensors are connected in an anti-series configuration, such that the resulting thermoelectric voltage is directly indicative of the difference of the upstream and downstream temperatures. In the following, the difference of the upstream and downstream temperatures will be designated as DTP. Instead of determining the temperature difference DTP, it is also possible to determine another thermal parameter that is indicative of the degree to which the upstream and downstream temperatures are different, such as the quotient of these temperatures or a normalized difference.

In the prior art, normally only the steady-state value of the thermal parameter DTP has been determined. This steady-state value is a measure of the mass flow rate of the fluid.

As already explained above, a contamination of the membrane 22 on one side of the heater 41 causes a change of both thermal conductivity and thermal capacity on that side, leading to an offset of the thermal parameter DTP that can easily be mistaken for a mass flow. As will be shown in the following, such contaminations can be detected and corrected for by analyzing the transient behavior of the thermal parameter DTP.

In the subsequent section a theoretical model will be introduced which illustrates in which ways contaminations affect the transient behavior of the temperature difference parameter DTP.

Equivalent Electrical Circuit

According to systems science, the behavior of certain parameters or components of a thermal system behave mathematically in a similar way as certain parameters or components of an electrical system. In particular, the equivalent variables for an electrical and thermal system are in standard systems science literature given as in the following Table:

| electrical parameter | ↔ | thermal parameter |
|---|---|---|
| I = current | ↔ | q = heat flow rate |
| V = voltage | ↔ | ΔT = temperature difference |
| C = capacitance | ↔ | C = thermal capacity |
| R = resistance | ↔ | R = thermal resistance |

In the following, an equivalent electrical circuit is introduced and analyzed to describe dynamic thermal phenomena on the sensing surface of the flow sensor.

Figure 4:
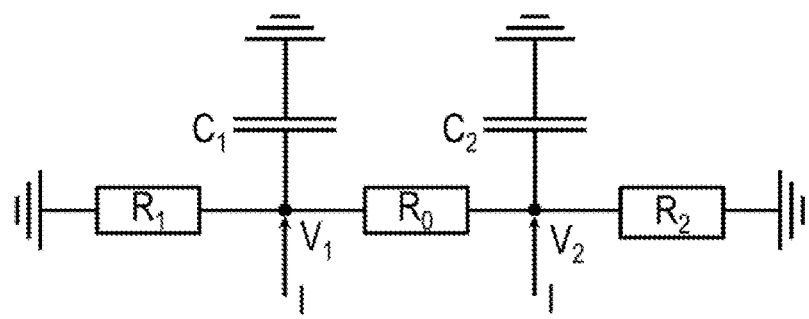
FIG. 4 shows an equivalent electrical circuit modelling the thermal properties of the flow sensor of FIG. 1.

FIG. 4 illustrates an equivalent electrical circuit that serves as an electrical model of the sensing surface. The upstream and downstream temperature sensors 31, 32 each are associated with a node in the equivalent electrical circuit. The equivalent voltage that corresponds to the temperature difference between the hot and cold junctions of the upstream temperature sensor is denoted as $V_1$. The equivalent voltage that corresponds to the temperature difference between the hot and cold junctions of the downstream temperature sensor is denoted as $V_2$. The equivalent electrical resistance corresponding to the thermal resistance of the membrane between the upstream and downstream temperature sensors is denoted as $R_0$, the equivalent electrical resistance corresponding to the thermal resistance of the upstream temperature sensor towards the adjacent substrate is denoted as $R_1$, and the equivalent electrical resistance corresponding to the thermal resistance of the downstream temperature sensor towards the adjacent substrate is denoted as $R_2$. The equivalent electrical capacitance corresponding to the thermal capacity of the upstream temperature sensor 31 and the adjacent membrane portions is denoted as $C_1$, and the equivalent electrical capacitance corresponding to the thermal capacity of the downstream temperature sensor 32 and the adjacent membrane portions is denoted as $C_2$. The equivalent current that corresponds to the heat flow rate received by each of the temperature sensors from the heater is denoted as I, the model assuming that both temperature sensors receive the same heat flow rate. The model further assumes that the cold junctions of both temperature sensors are at the same reference temperature, corresponding to electrical ground.

Mathematical Model

The differential equation for the equivalent electrical circuit shown in FIG. 4 can be found by using the standard Kirchhoff's circuit laws. Replacing electrical parameters again by thermal parameters, the following equation describes the dynamics of the up- and downstream temperatures $T_1$ and $T_2$ relative to the reference temperature of the substrate:

$$\begin{pmatrix} \dot{T}_1 \\ \dot{T}_2 \end{pmatrix} = \begin{pmatrix} -\left(\frac{1}{\tau_1} + \frac{1}{\tau_0}\right) & \frac{1}{\tau_0} \\ \frac{c}{\tau_0} & -\left(\frac{1}{\tau_2} + \frac{c}{\tau_0}\right) \end{pmatrix} \begin{pmatrix} T_1 \\ T_2 \end{pmatrix} + \frac{q}{C_1} \begin{pmatrix} 1 \\ c \end{pmatrix}$$

Here, q denotes the heat flow rate into each of the temperature sensors due to the heater power, and $c=C_1/C_2$ is the ratio of the thermal capacities of the upstream and downstream temperature sensors. The time constants are given by $\tau_0=R_0C_1$, $\tau_1=R_1C_1$ and $\tau_2=R_2C_2$. The boundary conditions are $T_1(0)=T_2(0)=0$, i.e., it is assumed that the system is in thermal equilibrium at the moment the heater is switched on.

The differential equation can be solved by diagonalizing the dynamical matrix. This yields the following two time constants:

$$\frac{1}{\tau_+} = \frac{1}{2}\left[\left(\frac{1}{\tau_1} + \frac{1}{\tau_2} + \frac{1+c}{\tau_0}\right) - \sqrt{\left(\frac{1}{\tau_1} - \frac{1}{\tau_2} + \frac{1-c}{\tau_0}\right)^2 + \frac{4c}{\tau_0^2}}\right],$$

$$\frac{1}{\tau_-} = \frac{1}{2}\left[\left(\frac{1}{\tau_1} + \frac{1}{\tau_2} + \frac{1+c}{\tau_0}\right) + \sqrt{\left(\frac{1}{\tau_1} - \frac{1}{\tau_2} + \frac{1-c}{\tau_0}\right)^2 + \frac{4c}{\tau_0^2}}\right].$$

It is instructive to use the symmetric and asymmetric combinations of $T_1$ and $T_2$:

DTP=$T_1$-$T_2$ (difference between up- and downstream temperatures)

STP=$T_1$+$T_2$ (sum of up- and downstream temperatures)

Using these variables, the differential equation reads $$D\dot{T}P = -\left[\frac{1}{2\tau_1} + \frac{1}{2\tau_2} + \frac{1+c}{\tau_0}\right] DTP - \left[\frac{1}{2\tau_1} - \frac{1}{2\tau_2}\right] STP + \frac{q}{C_1}(1-c)$$

$$S\dot{T}P = -\left[\frac{1}{2\tau_1} - \frac{1}{2\tau_2} + \frac{1-c}{\tau_0}\right] DTP - \left[\frac{1}{2\tau_1} + \frac{1}{2\tau_2}\right] STP + \frac{q}{C_1}(1+c)$$

Fully Symmetric Model

As an illustration of the model, first the fully symmetric model will be discussed, which corresponds to an ideal sensor. Due to the symmetry, we have $\tau_1=\tau_2=\tau$ and c=1, and the two time constants are given by $$\tau_+ = \tau,$$

$$\tau_- = \frac{\tau}{1 + \frac{2\tau}{\tau_0}}.$$

For symmetric heat input, the solutions are $$STP(t) = 2qR\left(1 - e^{-\frac{t}{\tau_+}}\right),$$

$$DTP(t) = 0.$$

with $R=R_1=R_2$.

This result shows that in a fully symmetric situation, a symmetric heat input does not lead to a DTP signal. Non-zero values for the parameter DTP can only occur if an asymmetry is present.

Almost Symmetric Model

Next, a situation is considered in which the upstream and downstream thermal resistances differ by an amount $\delta R$, and the upstream and downstream thermal capacities differ by an amount $\delta C$. Expressed mathematically:

$$R_1 = \overline{R} + \frac{\delta R}{2},$$
$$R_2 = \overline{R} - \frac{\delta R}{2},$$
$$C_1 = \overline{C} + \frac{\delta C}{2},$$
$$C_2 = \overline{C} - \frac{\delta C}{2}.$$

It is assumed that $|\delta R| \ll \overline{R}$ and $|\delta C| \ll \overline{C}$. Accordingly, the model is solved only up to linear (first) order in $\delta R/\overline{R}$ and $\delta C/\overline{C}$.

The solution for STP is given by $$STP = 2q\overline{R}\left(1 - e^{-\frac{t}{\tau_+}}\right)$$

with the STP time constant $$\frac{1}{\tau_+} \equiv \frac{1}{\overline{\tau}} = \frac{1}{\overline{R}\overline{C}}.$$

For the DTP problem, the solution can be written as a superposition of two universal functions $$DTP(t) = q\overline{R}\left[\frac{\delta R}{\overline{R}}f\left(\frac{t}{\overline{\tau}}, r\right) + \frac{\delta C}{\overline{C}}g\left(\frac{t}{\overline{\tau}}, r\right)\right].$$

The two universal functions are given by $$f(x, r) = r - \frac{r}{1-r}e^{-x} + \frac{r^2}{1-r}e^{-\frac{x}{r}}$$
$$g(x, r) = \frac{r}{1-r}\left(e^{-\frac{x}{r}} - e^{-x}\right)$$

with the ratio $$r = \frac{\tau_-}{\tau_+} < 1.$$

The DTP time constant $\tau_-$ is given by $$\frac{1}{\tau_-} = \frac{1}{\overline{\tau}} + \frac{2 + \delta C/\overline{C}}{\tau_0}.$$

Figure 5:
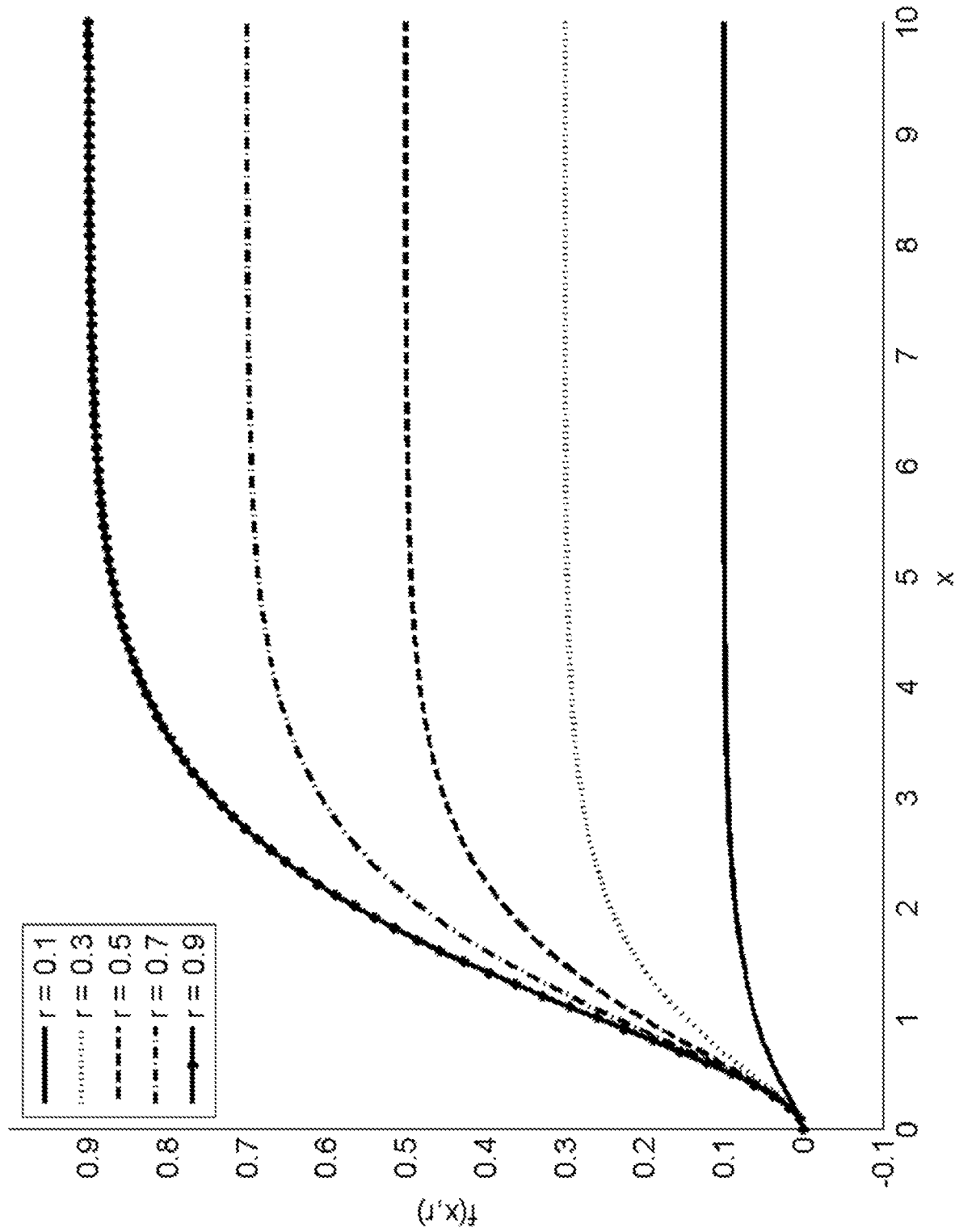
FIG. 5 shows a diagram representing the dependence of a first model function $f(x,r)$ on the variable x for various values of the variable r.
Figure 6:
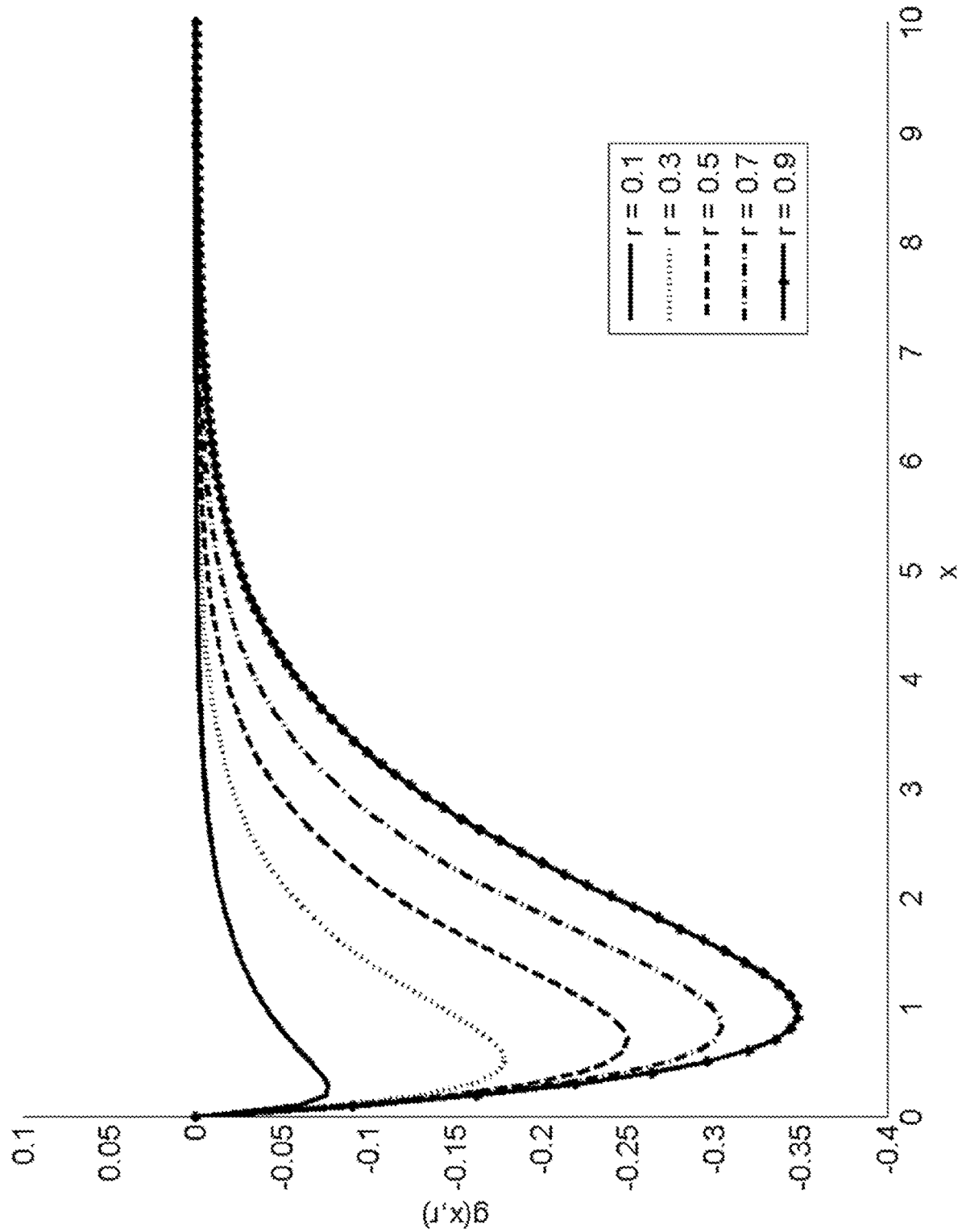
FIG. 6 shows a diagram representing the dependence of a second model function $g(x,r)$ on the variable x for various values of the variable r.

The dependence of the functions $f(x,r)$ and $g(x,r)$ on the variable x is illustrated in FIGS. 5 and 6, respectively, for various values of the ratio r.

Note that $g(t/\overline{\tau},r) \to 0$ for $t \to \infty$. In other words, the steady-state value of DTP only depends on the asymmetry of the thermal resistance $\delta R$ and is given by $DTP(t \to \infty) = \delta Rqr$.

Figure 7:
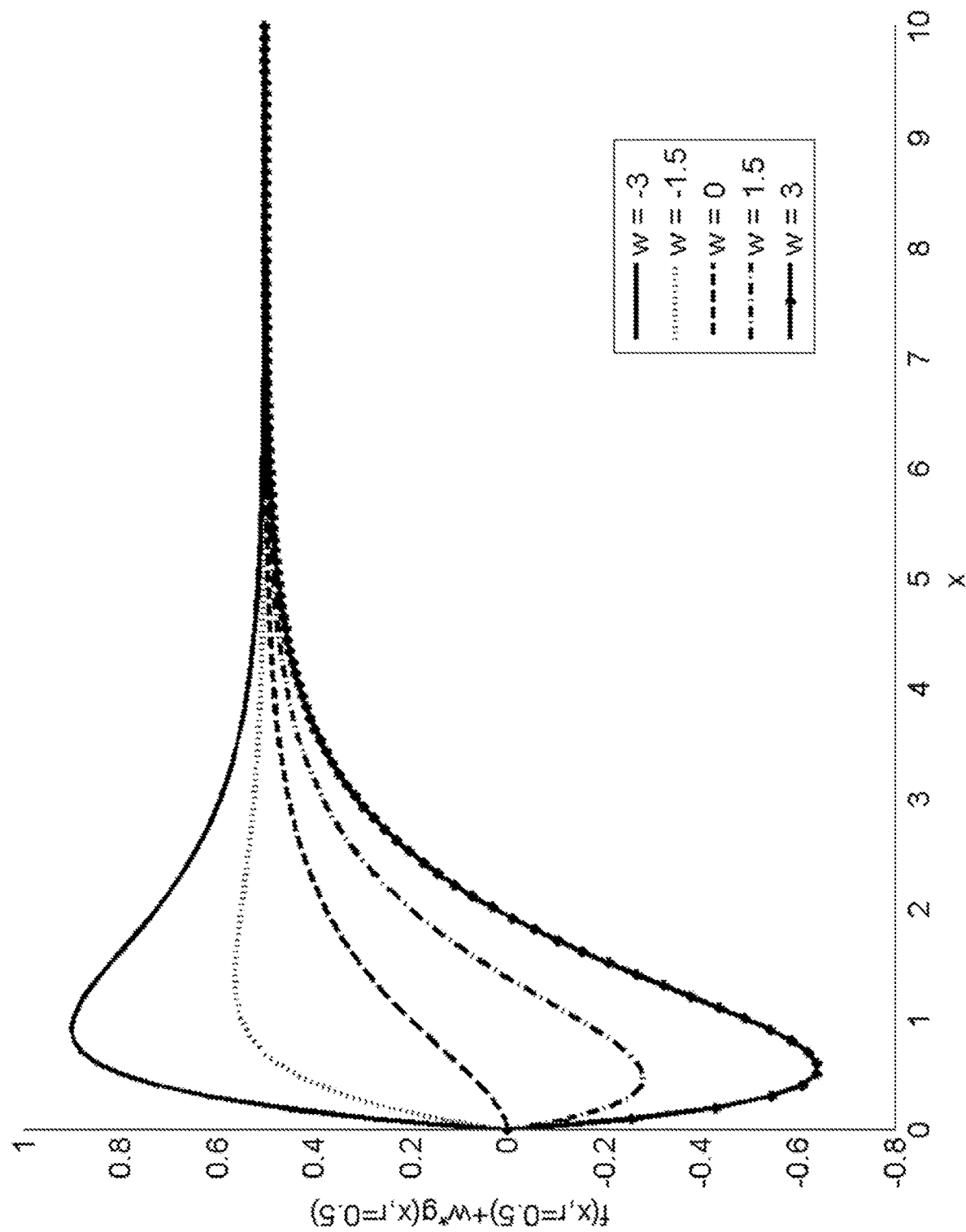
FIG. 7 shows a diagram representing the dependence of a weighted superposition of the first and second model functions $f(x,r)$ and $g(x,r)$ on the variable x for r=0.5 for various values of the weight w of $g(x,r)$.

As discussed above, the actual transient of DTP can be modeled by a weighted superposition of the functions $f(x,r)$ and $g(x,r)$. This is illustrated in FIG. 7, which shows a weighted superposition of the functions $f(x,r)$ and $g(x,r)$ at the fixed value r=0.5 for different weights of $g(x,r)$, i.e., for different contributions of $\delta C/\overline{C}$ relative to $\delta R/\overline{R}$. This sequence of curves illustrates that the shape of a transient that is predominantly due to an asymmetry $\delta C$ of the thermal capacity is different from the shape of a transient that is predominantly due to an asymmetry $\delta R$ of the thermal resistance.

Particle Detection Based on DTP

A particle or droplet on the sensing surface, i.e., on the membrane or on the elements that are disposed on the membrane, locally changes the thermal properties of the membrane and the elements thereon. This induces asymmetries $\delta C$ in the thermal capacity and $\delta R$ in the thermal resistance.

Particle Detection Using the Zero-Flow Steady-State Offset of DTP

As discussed above, the value of DTP for $t \to \infty$ (i.e., the steady-state offset of DTP) under zero-flow conditions is influenced only by the asymmetry of the thermal resistance $\delta R$. An asymmetry of $\delta R$ can therefore be detected by determining the steady-state offset of DTP under zero-flow conditions.

However, in this manner it is not possible to distinguish between a contamination and a membrane asymmetry because the asymmetry $\delta R$ could be caused by each of these effects. Therefore the following strategy can be pursued: After production, a reference steady-state offset of DTP for some defined heater power is determined and stored in a memory of the processing circuitry or in an external memory, e.g., a database. The reference offset will reflect any production-related asymmetries. At a later time in the field, the steady-state offset at zero flow is measured again and is compared to the reference offset. Any deviations of the measured steady-state offset from the reference offset will then reflect contaminations. Determination of the steady-state offset can be repeated from time to time to detect any additional contaminations that have occurred since the previous offset determination. The measured steady-state offset can also be stored in the memory and/or can be outputted for further analysis. It can be used for offset compensation in subsequent flow measurements.

It should be noted that this scheme requires that zero-flow conditions are established, because no distinction between a flow and a contamination can be made by measuring the steady-state value of DTP.

Particle Detection Using the Transient of DTP by Comparison to a Reference Transient The detection of contaminations can be improved by taking the transient behavior of DTP (i.e., the value of DTP at different points in times after a defined change in heater power) into account. As discussed above, the transient behavior is influenced both by the asymmetry $\delta R$ of the thermal resistance and by the asymmetry $\delta C$ of the thermal capacity. The presence of a particle or droplet on the membrane will usually influence the thermal capacity more strongly than the thermal resistance, and therefore transient measurements can be more sensitive to contaminations than steady-state measurements, which are only sensitive to asymmetries of the thermal resistance.

A simple strategy that utilizes the transient behavior of DTP can be implemented as follows: After production, a reference transient (i.e., the value of DTP at different points in times after a defined change in heater power) is determined and is stored in a memory of the processing circuitry or in an external memory. The reference transient will reflect any production-related asymmetries. Very few points in time may already be sufficient, e.g., three or four points, the first point for instance reflecting the value of DTP at the time the heater is switched on, one or two points reflecting the transient behavior of DTP, and the last point reflecting the steady-state value of DTP. At a later time, a transient measured in the field is compared to the reference transient. Any deviations of the magnitude and/or shape of the measured transient from the reference transient will then reflect contaminations. For instance, a transient amplitude difference can be computed from the difference between the measured transient and the reference transient at one or a few selected points in time, and the transient amplitude difference can be compared to a threshold to determine whether the measured transient differs to such a degree from the reference transient that it can be concluded that a contamination is present. This computation is so simple that it can readily be implemented by a logic circuit in an ASIC. Measurements of the transient can be repeated from time to time to detect any additional contaminations that have occurred since the previous measurement, e.g., by monitoring the transient amplitude over time. The measured transients or parameters derived therefrom, such as the transient amplitude, can be stored in a memory and/or can be outputted for further analysis.

The above procedure is preferably carried out under zero-flow conditions. However, it is also conceivable to carry out this procedure at non-zero flow. For instance, a plurality of reference transients for different flow rates can be stored in a memory of the processing circuitry. The actual flow rate can be determined from the steady-state value of DTP. The amplitude or shape of the associated transient can then be compared to the reference transient for that flow rate. In practice, this procedure works reasonably well for comparatively small flow rates, typically, for flow rates that do not exceed about 5% of the dynamic range of the flow sensor, in other words, of the maximum flow rate that can reasonably be determined by the flow sensor. This procedure may be particularly useful in gas meter applications where it is normally not readily possible to completely shut off the gas flow. The detection of contaminations can then be carried out at a time when the sensor output indicates that the flow rate is small.

Particle Detection by Fitting the Transient of DTP to a Superposition of Two Functions Since the shape of a transient due to an asymmetry $\delta C$ of the thermal capacity is different from the shape of a transient due to an asymmetry $\delta R$ of the thermal resistance, a contamination can be distinguished from a membrane asymmetry or a small flow by the shape of the transient of DTP. In contrast, in the above-discussed strategies, no attempt is made to directly distinguish between membrane asymmetries, small flows and contaminations by particles/droplets. Rather, it is inferred that a contamination is present by comparing measured data with reference data that already reflect the effects of membrane asymmetries and possibly of small flows.

A direct distinction between membrane asymmetries, small flows and contaminations becomes possible by utilizing the different relative effects of membrane asymmetries, small flows and contaminations on $\delta R/\overline{R}$ and $\delta C/\overline{C}$. A particle or droplet that has been deposited on the membrane will generally cause a different ratio between $\delta C/\overline{C}$ and $\delta R/\overline{R}$ than a membrane asymmetry or a small flow. In particular, the absolute value of this ratio will generally be larger for a particle or droplet that has been deposited on the membrane than for a membrane asymmetry or for a flow. As discussed above, the transient behavior of the thermal parameter DTP can be described by a weighted superposition of two functions, which in the above-discussed model were called $f(x,r)$ and $g(x,r)$. The weights of these functions correspond to $\delta R/\overline{R}$ and $\delta C/\overline{C}$, respectively. The two functions have different shapes (i.e., they depend differently on the variable x). By fitting the shape of the DTP transient to a superposition of the functions $f(x,r)$ and $g(x,r)$, membrane asymmetries or flows and contaminations can therefore be distinguished.

The analysis can be carried out as follows. Two model functions $f(x,r)$ and $g(x,r)$ can be determined, e.g., from a theoretical model of the sensing surface or from empirical data. If a theoretical model is used, the model can be the simple model used above, or it can be a more complex model of the sensing surface. The model functions can be stored in appropriate form in a memory of the processing circuitry or in an external memory. For instance, the values of the function can be directly stored for various value pairs of the variables (x,r), or the function can be parameterized (e.g., by a Taylor expansion), and the parameters that characterize the function (e.g., its Taylor coefficients up to a certain order) can be stored. A fitting procedure (e.g., a regression analysis) can be carried out in order to determine the weights for the two functions $f(x,r)$ and $g(x,r)$, of which the weighted superposition describes the DTP transient behavior as derived above. The weight of $g(x,r)$, being particularly sensitive to changes of $\delta C/\overline{C}$ due to the presence of particles or droplets, can be used as a signal for the detection of contaminations.

For determining the argument $x=t/\overline{\tau}$ of the functions $f(x,r)$ and $g(x,r)$, the value of $\overline{\tau}$ can be determined from an independent measurement, e.g., by determining the transient behavior of STP, whose time dependence is solely characterized by $\overline{\tau}$.

The fitting procedure is somewhat complicated by the fact that, at least in principle, not only the weights of the functions $f(x,r)$ and $g(x,r)$ depend on $\delta C/\overline{C}$, but the functions themselves also depend on $\delta C/\overline{C}$ via the variable r, i.e., the fitting parameters should in principle not only include the values of the weights of $f(x,r)$ and $g(x,r)$, but also the value of r, the dependence of r on $\delta C/\overline{C}$ being highly non-linear. However, to simplify the procedure, initially the value of r can be set to a fixed value corresponding to $\delta C/\overline{C}=0$ or to some other fixed value, e.g., to r=0.5. A first fit can be carried out for this fixed value of r. In many instances, this fit will already yield very good results as long as $\delta C/\overline{C}$ is small. If not, r can be iteratively changed and the fit repeated until a deviation parameter that indicates a deviation of the measured DTP values from the values of the fitted superposition is minimized.

Particle Detection Based on a Multi-Sector Thermal Parameter

The Four-Quadrant Thermal Parameter DiagDiff

Figure 8:
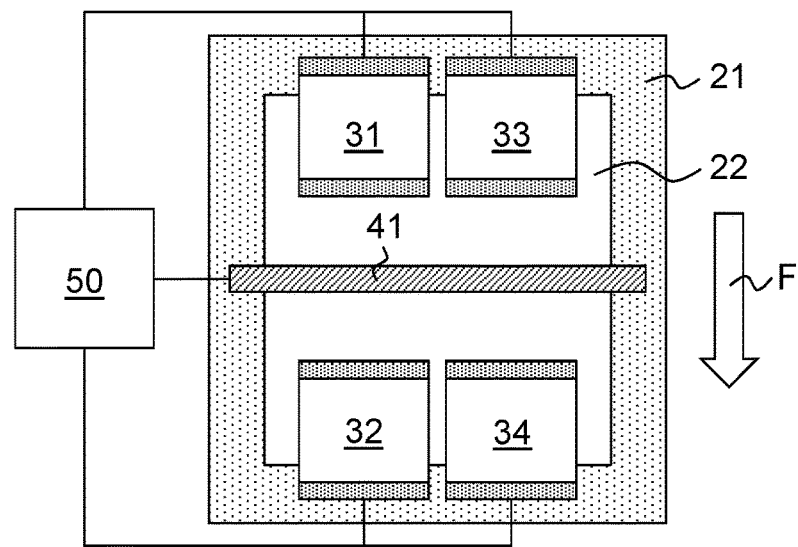
FIG. 8 shows a schematic functional representation of a flow sensor according to a second embodiment.

The up- and downstream temperature sensors can conceptually be halved such that four temperature sensors are formed, each located in a different quadrant of the sensing surface. An example is shown in FIG. 8. The flow sensor now comprises two upstream temperature sensors 31, 33 and two downstream temperature sensors 32, 34. In the following, the outputs of these temperature sensors will be called the upstream left [UL], upstream right [UR], downstream left [DL] and downstream right [DR] temperatures.

Several measurement modes are possible with such an arrangement of temperature sensors. Of particular interest is the difference between the difference of the outputs of the left and right upstream temperature sensors and the difference of the outputs of the left and right downstream temperature sensors (i.e., symbolically, (UR−UL)−(DR−DL)). This is the same as the difference between the DTP value of the right upstream and downstream temperature sensors and the DTP value of the left upstream and downstream temperature sensor (symbolically, (UR−DR)−(UL−DL)). This four-sector parameter, being a difference of sensor output differences, will in the following be called the diagonal-difference parameter DiagDiff.

To first (linear) order, the left and right halves of the sensing surface may be viewed as thermally independent. To this order the DiagDiff parameter is insensitive to a membrane asymmetry perpendicular to the heater, which is common to both the right and left temperature sensors, and to a membrane asymmetry parallel to the heater, which is common to both the upstream and downstream temperature sensors.

However, the DiagDiff parameter is sensitive to contaminations that are present only in one of the quadrants or that are unevenly distributed over the four quadrants. This is usually the case with contaminations by single particles or droplets. Therefore the DiagDiff parameter can be used to detect contaminations while filtering out contributions from the most common types of membrane asymmetries.

To first order the DiagDiff parameter is also independent of the flow rate of the fluid flow, since the resulting flow signals enter with opposite signs. Therefore the DiagDiff parameter can be used to detect contaminations also in the presence of a fluid flow.

This is true both for the steady-state value of the DiagDiff parameter and for the transient behavior of the DiagDiff parameter. Both can be used for the detection of contaminations by particles or droplets.

Particle Detection Using the Steady-State Value of DiagDiff

If only the steady-state value of the DiagDiff parameter is used for the detection of contaminations, the following strategy can be employed: After production, a reference steady-state value of DiagDiff is determined and stored in a memory of the processing circuitry or in an external memory, e.g., a database. The reference steady-state value of DiagDiff will reflect any production-related quadrupolar membrane asymmetries. At a later time in the field, the steady-state value of DiagDiff is measured again and is compared to the reference value. Any deviations of the measured steady-state value of DiagDiff from the reference value will then reflect contaminations. Determination of the steady-state value of DiagDiff can be repeated from time to time to detect any additional contaminations that have occurred since the previous offset determination. The measured steady-state value of DiagDiff can also be stored in a memory and/or can be outputted for further analysis.

Particle Detection Using the Transient Behavior of DiagDiff

If the transient behavior of the DiagDiff parameter is analyzed, the same strategies as explained above in connection with the transient of the DTP parameter can be employed. Because the DiagDiff parameter is, to first order, independent of the flow rate, it becomes readily possible to distinguish between a contamination and a fluid flow. Therefore, contaminations can be readily detected also in the presence of a fluid flow. In particular, after production, a reference transient for DiagDiff can be determined and stored in a memory of the processing circuitry or in an external memory. The reference transient will reflect any production-related asymmetries. Again, very few points in time may already be sufficient, e.g., four points. At a later time, a transient of DiagDiff measured in the field is compared to the reference transient. Any deviations of the magnitude and/or shape of the measured transient from the reference transient will then reflect contaminations. For instance, a transient amplitude difference for DiagDiff can be computed from the difference between the measured transient of DiagDiff and the reference transient at one or a few selected points in time, and the amplitude difference can be compared to a threshold to determine whether the measured transient differs to such a degree from the reference transient that it can be concluded that a contamination is present.

By fitting the transient of DiagDiff to two model functions, it additionally becomes possible to directly distinguish between contaminations and quadrupolar asymmetries of the membrane, in a very similar manner as explained above in connection with the transient of the DTP parameter.

Other Four-Quadrant Thermal Parameters

It should be noted that other four-quadrant parameters are also independent of the fluid flow to first order, in particular, the sum of the difference of the outputs of the left and right upstream temperature sensors and the difference of the outputs of the left and right downstream temperature sensors (i.e., symbolically, (UR−UL)+(DR−DL)). This is the same as the difference between the STP values of the right upstream and downstream temperature sensors and of the left upstream and downstream temperature sensors (symbolically, (UR+DR)−(UL+DL)). In yet another form, this can be expressed as (UR−DL)−(UL−DR). The latter form reflects a preferred wiring scheme if the temperature sensors are thermopiles, a "plus" sign indicating that the corresponding thermopiles are connected in a series configuration, and a "minus" sign indicating that the corresponding thermopiles are connected in an anti-series configuration. Of course, other wiring schemes are possible as well. While this four-sector parameter is sensitive to contaminations by particles or droplets while being insensitive to the flow rate, as desired, it is unfortunately also sensitive to geometrical asymmetries of the membrane parallel to the heater. This four-quadrant parameter is therefore less preferred for the detection of contaminations than the DiagDiff parameter.

Generalization to Other Multi-Sector Thermal Parameters

The sensing surface can be subdivided into more than four sectors. For instance, the sensing surface can be subdivided into six, eight, ten or more sectors. Accordingly, three, four, five or more upstream temperature sensors and the same number of downstream temperature sensors can be employed, each temperature sensor being located in one of the sectors. From the sensor outputs, a multi-sector thermal parameter can be formed. For instance, the multi-sector thermal parameter can represent a sum or difference of an upstream temperature inhomogeneity parameter and a downstream temperature inhomogeneity parameter, each of these temperature inhomogeneity parameters in turn being indicative of an inhomogeneity among the temperatures determined by the respective sensors. Many possibilities exist for forming such temperature inhomogeneity parameters. The same advantages can be achieved, using a general multi-sector thermal parameter, as the advantages discussed above in connection with the four-quadrant thermal parameters, a four-quadrant parameter being just an example of the more general concept of a multi-sector thermal parameter.

It is remarked that also the DTP and STP parameters can be regarded as particularly simple forms of multi-sector parameters, involving temperature signals from just two sectors.

Bridges Instead of a Full Membrane

Figure 9:
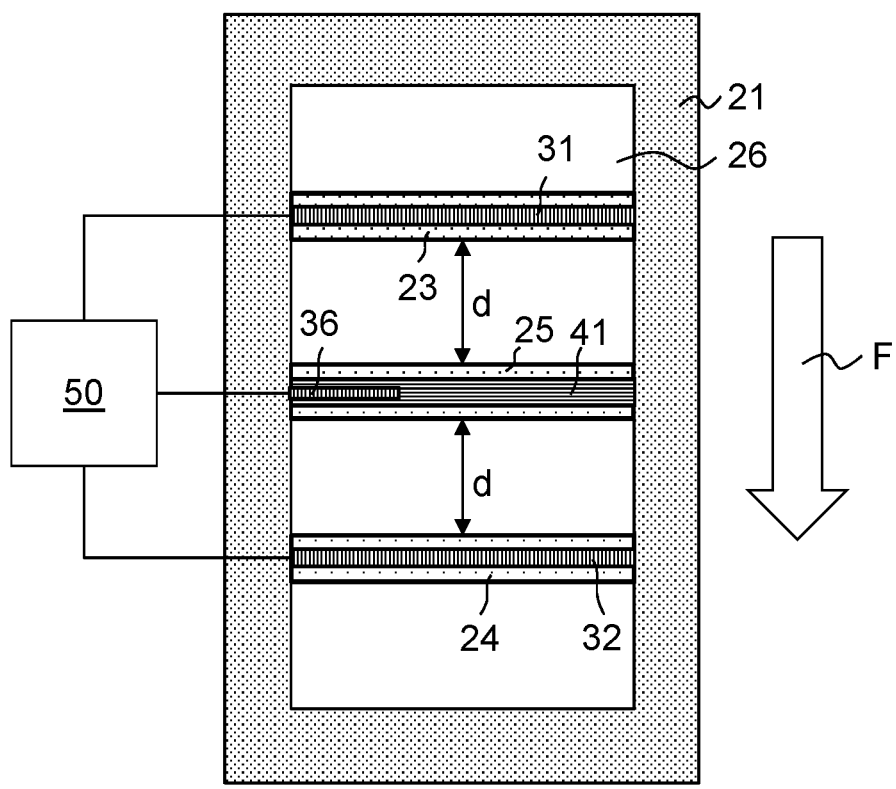
FIG. 9 shows a schematic functional representation of a flow sensor according to a third embodiment.

Instead of integrating the heater and the temperature sensors into a full membrane, these structures can also be realized as bridges separated by void spaces. An example is illustrated in FIG. 9, which schematically shows a thermal flow sensor that comprises a substrate 21 in which an opening 26 or a recess has been created. Three separate bridges 23, 24, 25 of a dielectric material span the opening 26 or recess. The bridges extend perpendicular to the flow direction F and are separated by a distance d. On the first bridge 23, an upstream temperature sensor 31 is formed, on the second bridge 24, a downstream temperature sensor 32 is formed, and on the third bridge 25, a heater 41 is formed. An additional temperature sensor 36 measures the heater temperature. All these components are again connected to processing circuitry 50. For further details, reference is made to EP 3 367 087 A2.

The sensing surface is formed by the surface of the bridges and of the elements disposed thereon. Contaminations on this sensing surface cause very similar effects as contaminations on a full membrane and can be detected in the same manner as described above in connection with embodiments having a full membrane.

In particular, it is possible to divide the bridges that carry the temperature sensors into four or more sectors and to employ a multi-sector thermal parameter for the detection of contaminations, as described above in connection with embodiments having a full membrane.

Figure 10:
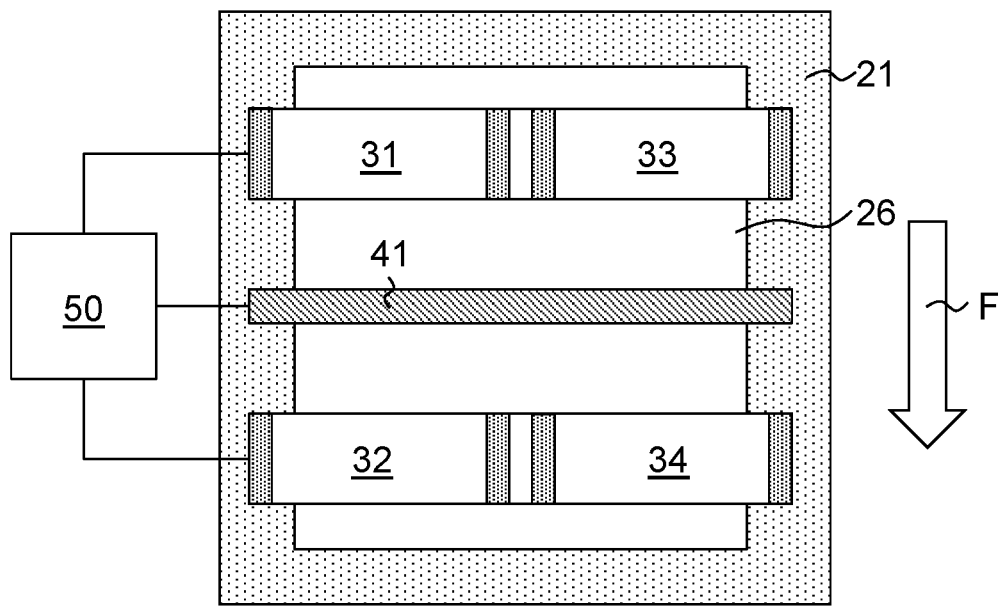
FIG. 10 shows a schematic functional representation of a flow sensor according to a fourth embodiment.

An example is illustrated in FIG. 10. In this example, the upper bridge carries two upstream temperature sensors 31, 33 in the form of thermopiles. In contrast to the membrane embodiment of FIGS. 3 and 8, the cold junctions of the thermopiles are arranged laterally at the ends of the bridge. In the same manner, the lower bridge carries to downstream temperature sensors 32, 34.

Figure 11:
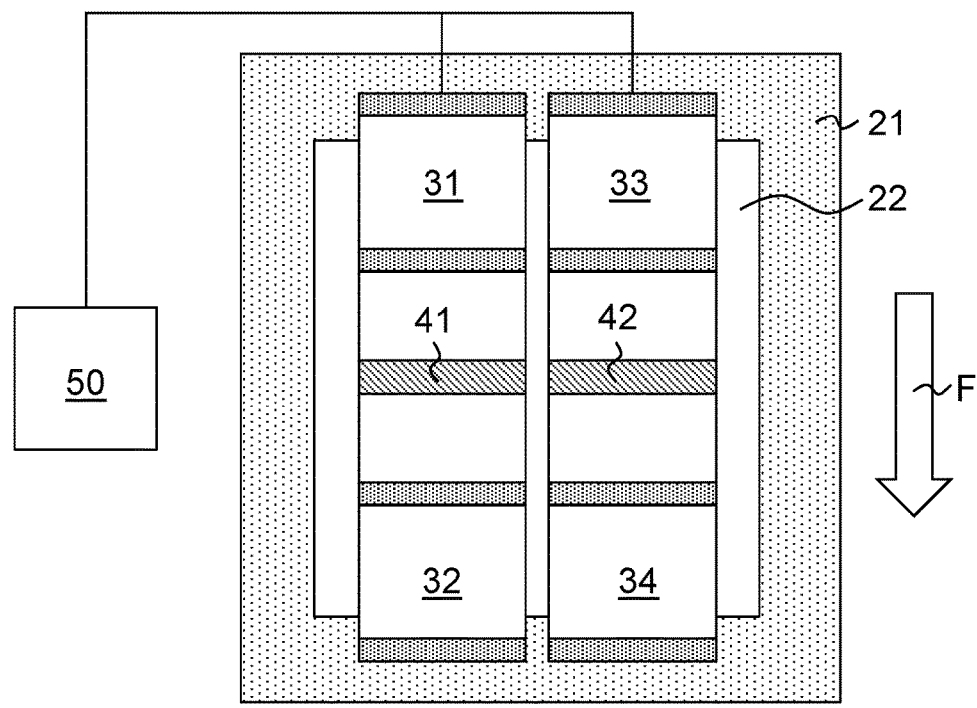
FIG. 11 shows a schematic functional representation of a flow sensor according to a fifth embodiment.

Another example is illustrated in FIG. 11. The bridges now extend along the flow direction F. Each bridge carries an independent heater 41, 42 and an upstream and a downstream temperature sensor 31, 32 and 33, 34 respectively. It is also possible to provide a separate central third bridge that carries the heater.

The same strategies for detecting contaminations can be used as in the embodiments having a full membrane.

Generalization to Other Types of Thermal Sensors

Instead of one or more heaters, one or more coolers can be used. This is particularly useful in applications where the flow medium should not be heated above a certain temperature. The cooler can comprise one or more cooling elements, e.g., one or more Peltier elements.

The present invention can not only be employed for detecting contaminations on flow sensors, but also on other types of thermal sensors, for instance the thermal sensor for detecting thermal capacity of a fluid disclosed in EP 3 367 087 A2.

In a simple embodiment, the thermal sensor may comprise only a single temperature sensor. Even in this case it is still possible to detect contaminations by analyzing the transient behavior of the temperature signal from the single temperature sensor. Similarly to the transient of DTP or DiagDiff discussed above, also the transient of the temperature signal from a single temperature sensor is affected differently by changes of the thermal capacity and by changes of the thermal conductivity. By analyzing the transient behavior, in particular, its shape, it therefore becomes possible to detect contaminations even when using only a single temperature sensor.

Figure 12:
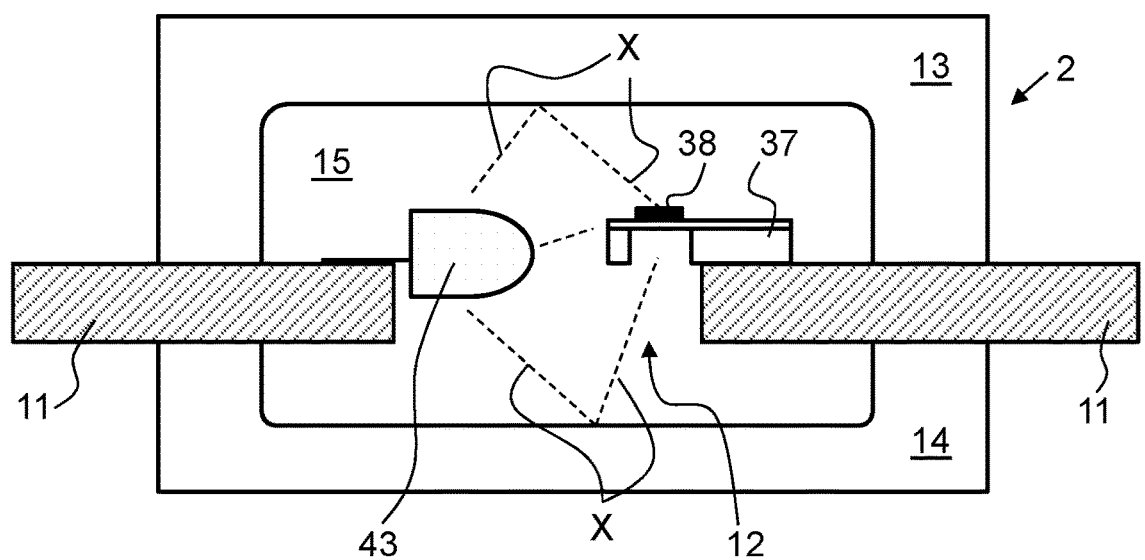
FIG. 12 shows, in a highly schematic manner, a sectional view of an infrared gas sensor.

Another example is illustrated in FIG. 12, which shows, in a highly schematic manner, an infrared gas sensor for detecting a gas such as carbon dioxide by its absorption of infrared (IR) radiation. The gas sensor of FIG. 12 comprises a carrier board 11 having an opening 12. A light bulb 43 is arranged on the carrier board 11, extending into the opening 12. Opposite to the light bulb 43, an infrared detector is arranged, which likewise extends into the opening 12. The infrared detector comprises a temperature sensor 37 having a thin membrane on which an IR-absorbing layer 38 is disposed. The temperature sensor can comprise, for instance, one or more thermopiles arranged on or in the membrane. A capsule comprising an upper capsule part 13 and a lower capsule part 14 defines a radiation cell 15. In operation, the light bulb 43 is activated to emit IR radiation. The IR radiation reaches the IR detector via a plurality of radiation paths X. The IR radiation causes the IR-absorbing layer 38 to heat up. The resulting rise in temperature is detected by the temperature sensor 37. If a gas in the radiation cell 15 absorbs the IR radiation, the rise in temperature will be lower than in the absence of the gas. Thereby the gas can be detected. For details, reference is made to EP 3 144 663 A1, which is incorporated herein in its entirety for teaching gas sensors that employ such a sensing principle.

Contaminations of the temperature sensor 37 in such a gas sensor can be detected by analyzing the transient behavior of the temperature signal after a change of power of the light bulb 43. As in the previously-discussed embodiments, a contamination in the form of a particle or droplet deposited on the membrane or on the IR-absorbing material will change this transient behavior. In particular, such a contamination will increase the thermal capacity of the membrane, which will in turn change the shape of the transient of the temperature signal.

Block Diagram of Processing Circuitry

The processing circuitry can be completely integrated with the heater and the temperature sensors, in particular, on the same substrate, or at least parts of the processing circuitry can be implemented remotely from these elements. For instance, in simple embodiments, the above-discussed methods of detecting contaminations can be implemented in an ASIC that is integrated on the same substrate as the heater and the temperature sensors, the ASIC implementing a simple state machine. In other embodiments, more sophisticated processing circuitry can be used, for instance, comprising a program-controlled microprocessor.

Figure 13:
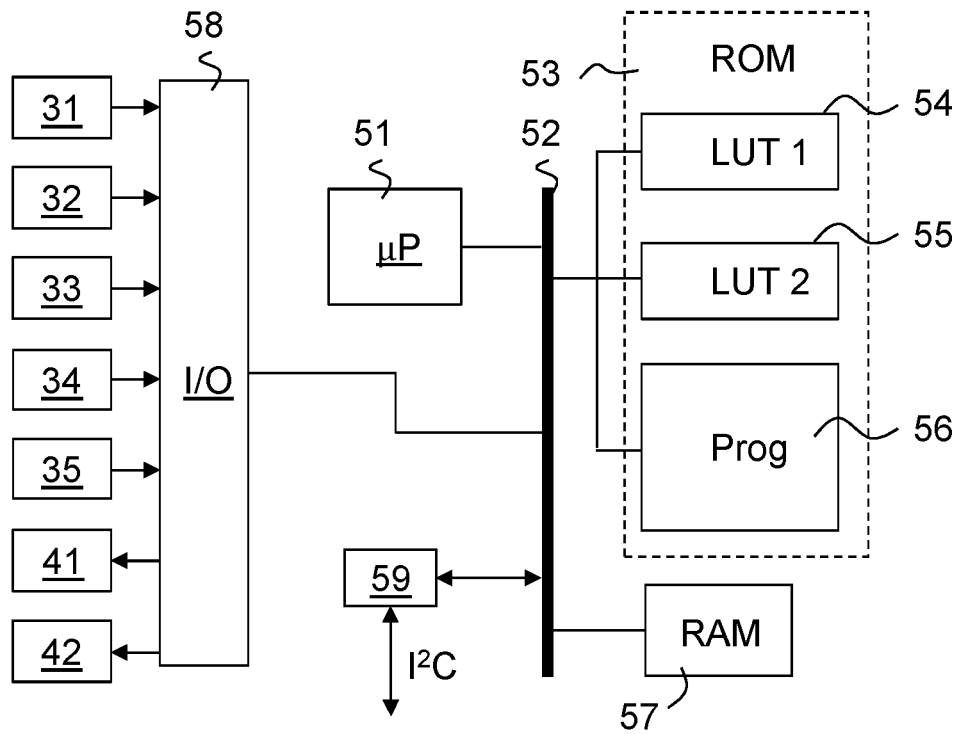
FIG. 13 shows a schematic block diagram of processing circuitry that may be used in conjunction with the present invention.

FIG. 13 illustrates a highly schematic block diagram of exemplary processing circuitry that can be used in connection with the present invention. The processing circuitry essentially forms a microcontroller comprising a microprocessor (μP) 51 connected to a data bus 52. Data are exchanged via the bus with a read-only memory (ROM) 53, a random-access memory (RAM), and a communication interface 59, e.g., an $I^2C$ interface. The ROM 53 stores, inter alia, lookup tables LUT1, LUT2, symbolized by boxes 54, 55, and program instructions for the microprocessor 51, symbolized by box 56. The lookup tables can contain, for instance, calibration data, reference values and/or reference functions as well as data that represents the above-discussed model functions. Also connected to the bus 52 is an input/output (I/O) interface 58, which includes components such as multiplexers and ADCs for reading out the temperature sensors 31-35 and drivers or switches for driving the heaters

41, 42. A possible hardware implementation can be realized as disclosed in WO 01/98736 A1 or in EP 1 965 179 A1.

Flow Charts of Methods

Figure 14:
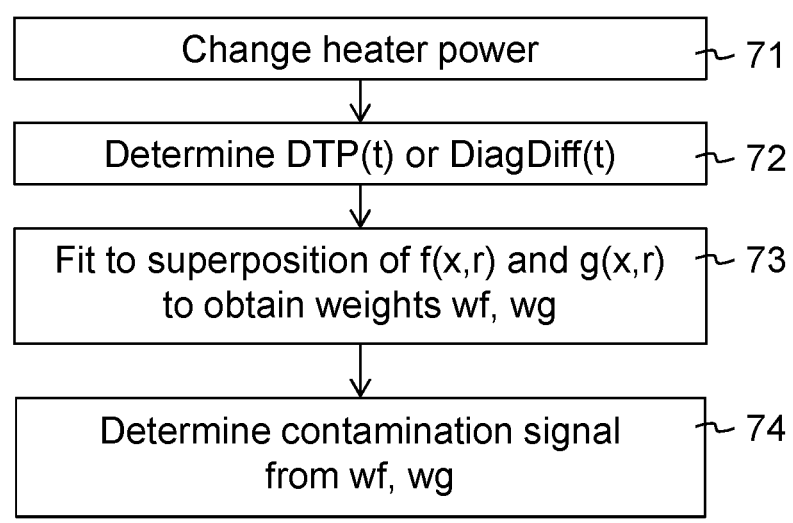
FIG. 14 shows a flow diagram for a method according to a first embodiment.
Figure 15:
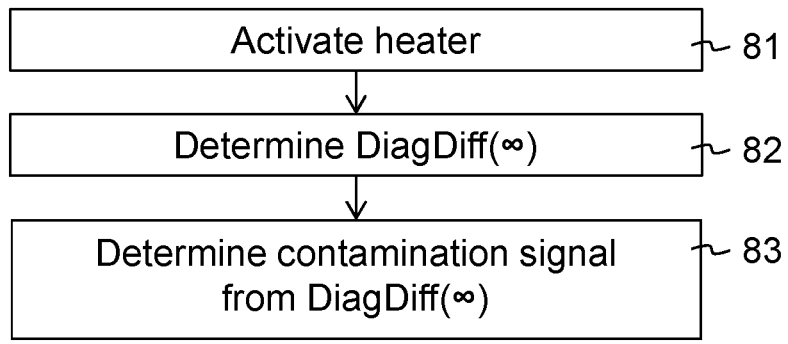
FIG. 15 shows a flow diagram for a method according to a second embodiment.
Figure 16:
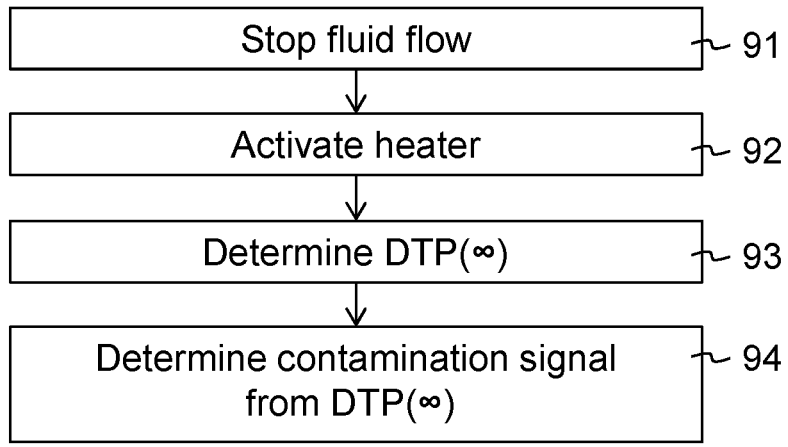
FIG. 16 shows a flow diagram for a method according to a third embodiment.

Some of the above-discussed strategies for detecting a contamination on the sensing surface are illustrated in the flow charts of FIGS. 14 to 16.

The flow chart of FIG. 14 illustrates a strategy that analyzes the transient behavior of a thermal parameter such as DTP or DiagDiff. In step 71, the heater power is changed. In step 72, DTP or DiagDiff are sampled at a plurality of time points t. In step 73, the resulting transient is analyzed by fitting the transient to a superposition of the model functions $f(x,r)$ and $g(x,r)$ to obtain weights wf and wg for these model functions. In step 74, a contamination signal is derived from these weights. The contamination signal can subsequently be outputted or stored.

The flow chart of FIG. 15 illustrates a strategy that analyzes the steady-state value of a multi-sector thermal parameter such as DiagDiff. In step 81, the heater is activated. In step 82, the steady-state value DiagDiff($\infty$) is determined. In step 83, a contamination signal is derived from this steady-state value, e.g., by comparison with a reference value.

The flow chart of FIG. 16 illustrates a strategy that analyzes the steady-state value of a thermal parameter such as DTP at zero flow. In step 91, the fluid flow is stopped. In step 92, the heater is activated. In step 93, the steady-state value of DTP is determined. In step 94, a contamination signal is derived from this steady-state value, e.g., by comparison with a reference value.

It is to be understood that the present invention is not limited to the above exemplary embodiments, and that many modifications can be applied without leaving the scope of the present invention.

The invention claimed is:

1. A thermal sensor comprising:
an active element configured to be supplied with power so as to cause a temperature change of the active element;
at least one temperature sensor; and
processing circuitry configured to carry out the following steps:
causing a change of power supplied to the active element;
at a plurality of times after said change of power, determining a thermal parameter based on at least one output signal of the at least one temperature sensor to obtain a time-dependent transient behavior of the thermal parameter in response to the change of power;
analyzing said time-dependent transient behavior of the thermal parameter in response to the change of power;
based on the analysis of the time-dependent transient behavior of the thermal parameter, determining a contamination signal that is indicative of a contamination on a sensing surface of the thermal sensor.

2. The thermal sensor of claim 1,
wherein the step of analyzing the time-dependent transient behavior of the thermal parameter comprises comparing the time-dependent transient behavior of the thermal parameter to a time-dependent reference transient, and/or
wherein the step of analyzing the time-dependent transient behavior of the thermal parameter comprises deriving a transient amplitude and comparing the transient amplitude to a reference amplitude or to a threshold.

3. The thermal sensor of claim 1,
wherein the step of analyzing the time-dependent transient behavior of the thermal parameter comprises carrying out a fitting procedure of a superposition of at least two time-dependent functions to the time-dependent transient behavior of the thermal parameter to obtain a weighting factor for at least one of the functions; and
wherein the step of determining the contamination signal includes taking into account the at least one weighting factor determined by the fitting procedure.

4. The thermal sensor of claim 1, wherein the thermal sensor comprises a plurality of temperature sensors arranged in different sectors of the sensing surface, and wherein the thermal parameter is a multi-sector thermal parameter based on a combination of output signals of the plurality of temperature sensors.

5. The thermal sensor of claim 4,
wherein the temperature sensors include at least one first temperature sensor and at least one second temperature sensor, and
wherein the multi-sector thermal parameter is a temperature-difference parameter that is indicative of a temperature difference between the first and second temperature sensors.

6. The thermal sensor of claim 5, wherein the at least one first temperature sensor is arranged on a first side of the active element, and wherein the at least one second temperature sensor is arranged on a second side of the active element opposite to the first side.

7. The thermal sensor of claim 4,
wherein the thermal sensor comprises at least two first temperature sensors and at least two second temperature sensors, and
wherein the multi-sector thermal parameter is indicative of a sum or difference of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors.

8. The thermal sensor of claim 7,
wherein the first temperature sensors are left and right first temperature sensors arranged on the first side of the active element, wherein the second temperature sensors are left and right second temperature sensors arranged on the second side of the active element, the left second temperature sensor being aligned with the left first temperature sensor, and the right second temperature sensor being aligned with the right first temperature sensor, and
wherein the multi-sector thermal parameter is a diagonal-difference parameter, the diagonal-difference parameter being indicative of a difference between a first temperature inhomogeneity parameter and a second temperature inhomogeneity parameter, the first temperature inhomogeneity parameter being indicative of a temperature inhomogeneity between the left and right first temperature sensors, and the second temperature inhomogeneity parameter being indicative of a temperature difference between the left and right second temperature sensors.

9. A thermal sensor comprising:
an active element configured to be supplied with power so as to cause a temperature change of the active element;
at least two first temperature sensors arranged in different sectors of the sensing surface;

at least two second temperature sensors arranged in different sectors of the sensing surface; and processing circuitry configured to carry out the following steps:

causing power to be supplied to the active element;

determining a multi-sector thermal parameter based on a combination of output signals of the at least two first temperature sensors and the at least two second temperature sensors, the multi-sector thermal parameter being indicative of a difference of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors; and determining a contamination signal that is indicative of a contamination on a surface of the thermal sensor based on the multi-sector thermal parameter.

10. The thermal sensor of claim 9, wherein the at least two first temperature sensors are arranged on a first side of the active element, and wherein the at least two second temperature sensors are arranged on a second side of the active element opposite to the first side.

11. The thermal sensor of claim 9,
wherein the first temperature sensors are left and right first temperature sensors arranged on the first side of the active element, wherein the second temperature sensors are left and right second temperature sensors arranged on the second side of the active element, the left second temperature sensor being aligned with the left first temperature sensor, and the right second temperature sensor being aligned with the right first temperature sensor, and wherein the multi-sector thermal parameter is a diagonal-difference parameter, the diagonal-difference parameter being indicative of a difference between a first temperature inhomogeneity parameter and a second temperature inhomogeneity parameter, the first temperature inhomogeneity parameter being indicative of a temperature inhomogeneity between the left and right first temperature sensors, and the second temperature inhomogeneity parameter being indicative of a temperature difference between the left and right second temperature sensors.

12. A method of determining contaminations on a sensing surface of a thermal sensor, the thermal sensor comprising an active element comprised of a heater or cooler that is configured to be supplied with power so as to cause a temperature change of the active element, and at least one temperature sensor, the method comprising:

causing a change of power supplied to the active element;

at a plurality of times after said change of power, determining a thermal parameter based on output signals from the at least one temperature sensor to obtain a time-dependent transient behavior of the thermal parameter in response to the change of power;

analyzing said time-dependent transient behavior of the thermal parameter in response to the change of power;

based on the analysis of the time-dependent transient behavior of the thermal parameter, determining a contamination signal that is indicative of a contamination on a sensing surface of the thermal sensor.

13. The method of claim 12,
wherein the step of analyzing the time-dependent transient behavior of the thermal parameter comprises comparing the said time-dependent transient behavior of the thermal parameter to a time-dependent reference transient, and/or wherein the step of analyzing the time-dependent transient behavior of the thermal parameter comprises deriving a transient amplitude and comparing the transient amplitude to a reference amplitude or to a threshold.

14. The method of claim 12,
wherein the step of analyzing the time-dependent transient behavior of the thermal parameter comprises carrying out a fitting procedure of a superposition of at least two time-dependent functions to the time-dependent transient behavior of the thermal parameter to obtain a weighting factor for at least one of the functions; and wherein the step of determining the contamination signal includes taking into account the at least one weighting factor determined by the fitting procedure.

15. The method of claim 12, wherein the thermal sensor comprises a plurality of temperature sensors arranged in different sectors of the sensing surface, and wherein the thermal parameter is a multi-sector thermal parameter based on a combination of output signals of the plurality of temperature sensors.

16. The method of claim 15, wherein the temperature sensors include at least one first temperature sensor and at least one second temperature sensor, wherein the multi-sector thermal parameter is a temperature-difference parameter that is indicative of a temperature difference between the first and second temperature sensors.

17. The method of claim 16, wherein the first and second temperature sensors are arranged on opposite sides of the active element.

18. The method of claim 15, wherein the thermal sensor comprises at least two first temperature sensors and at least two second temperature sensors, the multi-sector thermal parameter being indicative of a sum or difference of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors.

19. The method of claim 18,
wherein the first temperature sensors are left and right first temperature sensors arranged on the first side of the active element, wherein the second temperature sensors are left and right second temperature sensors arranged on the second side of the active element, the left second temperature sensor being aligned with the left first temperature sensor, and the right second temperature sensor being aligned with the right first temperature sensor, and wherein the multi-sector thermal parameter is a diagonal-difference parameter, the diagonal-difference parameter being indicative of a difference between a first temperature inhomogeneity parameter and a second temperature inhomogeneity parameter, the first temperature inhomogeneity parameter being indicative of a temperature inhomogeneity between the left and right first temperature sensors, and the second temperature inhomogeneity parameter being indicative of a temperature difference between the left and right second temperature sensors.

20. A method of determining contaminations on a sensing surface of a thermal sensor, the thermal sensor comprising an active element configured to be supplied with power so as to cause a temperature change of the active element, at least two first temperature sensors arranged in different sectors of the sensing surface, and at least two second temperature sensors arranged in different sectors of the sensing surface, the method comprising:
   causing power to be supplied to the active element;
   determining a multi-sector thermal parameter based on a combination of output signals of the at least two first temperature sensors and the at least two second temperature sensors, the multi-sector thermal parameter being indicative of a difference of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors; and
   determining a contamination signal that is indicative of a contamination on a surface of the thermal sensor device based on the multi-sector thermal parameter.

21. The method of claim 20, wherein the at least two first temperature sensors are arranged on a first side of the active element, and wherein the at least two second temperature sensors are arranged on a second side of the active element opposite to the first side.

22. The method of claim 20,
   wherein the first temperature sensors are left and right first temperature sensors arranged on the first side of the active element, wherein the second temperature sensors are left and right second temperature sensors arranged on the second side of the active element, the left second temperature sensor being aligned with the left first temperature sensor, and the right second temperature sensor being aligned with the right first temperature sensor, and
   wherein the multi-sector thermal parameter is a diagonal-difference parameter, the diagonal-difference parameter being indicative of a difference between a first temperature inhomogeneity parameter and a second temperature inhomogeneity parameter, the first temperature inhomogeneity parameter being indicative of a temperature inhomogeneity between the left and right first temperature sensors, and the second temperature inhomogeneity parameter being indicative of a temperature difference between the left and right second temperature sensors.

23. A thermal sensor comprising:
   an active element configured to be supplied with power so as to cause a temperature change of the active element;
   at least two first temperature sensors arranged in different sectors of the sensing surface;
   at least two second temperature sensors arranged in different sectors of the sensing surface; and
   processing circuitry configured to carry out the following steps:
   causing power to be supplied to the active element;
   determining a multi-sector thermal parameter based on a combination of output signals of the at least two first temperature sensors and the at least two second temperature sensors, the multi-sector thermal parameter being indicative of a sum of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors; and
   determining a contamination signal that is indicative of a contamination on a surface of the thermal sensor based on the multi-sector thermal parameter.

24. A method of determining contaminations on a sensing surface of a thermal sensor, the thermal sensor comprising an active element configured to be supplied with power so as to cause a temperature change of the active element, at least two first temperature sensors arranged in different sectors of the sensing surface on a first side of the active element, and at least two second temperature sensors arranged in different sectors of the sensing surface on a second side of the active element opposite to the first side, the method comprising:causing power to be supplied to the active element;
   determining a multi-sector thermal parameter based on a combination of output signals of the at least two first temperature sensors and the at least two second temperature sensors, the multi-sector thermal parameter being indicative of a sum of a first temperature inhomogeneity parameter and a second temperature inhomogeneity parameter, the first temperature inhomogeneity parameter being indicative of a temperature inhomogeneity among the first temperature sensors, and the second temperature inhomogeneity parameter being indicative of a temperature inhomogeneity among the second temperature sensors; and
   determining a contamination signal that is indicative of a contamination on a surface of the thermal sensor device based on the multi-sector thermal parameter.

* * * * *